(12) United States Patent
Ellzey et al.

(10) Patent No.: US 10,124,880 B1
(45) Date of Patent: Nov. 13, 2018

(54) ROTATABLE CONTROL SURFACE ASSEMBLY FOR AN UNMANNED AERIAL VEHICLE

(71) Applicant: Lockheed Martin Corporation, Bethesda, MD (US)

(72) Inventors: Steven J. Ellzey, Grand Prairie, TX (US); James C. Copp, Arlington, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 276 days.

(21) Appl. No.: 15/014,399

(22) Filed: Feb. 3, 2016

(51) Int. Cl.
| | | |
|---|---|---|
| *B64C 3/38* | (2006.01) | |
| *B64C 9/06* | (2006.01) | |
| *B64C 9/36* | (2006.01) | |
| *B64C 39/02* | (2006.01) | |

(52) U.S. Cl.
CPC ............. *B64C 3/385* (2013.01); *B64C 9/06* (2013.01); *B64C 9/36* (2013.01); *B64C 39/024* (2013.01); *B64C 2201/20* (2013.01)

(58) Field of Classification Search
CPC ..... B64C 3/385; B64C 9/06; B64C 2201/042; B64C 9/36; B64C 2201/20; B64C 2201/201; B64C 39/024; B64C 11/28; B64C 3/546; B64C 11/063
See application file for complete search history.

(56) References Cited

U.S. PATENT DOCUMENTS

| | | | | |
|---|---|---|---|---|
| 2,417,896 A | * | 3/1947 | Zimmerman | ......... B64C 39/026 244/17.15 |
| 2,539,489 A | * | 1/1951 | Smith | ...................... B64C 37/00 244/2 |
| 2,580,176 A | * | 12/1951 | Johnson | ..................... B64C 5/06 244/87 |
| 2,955,780 A | * | 10/1960 | Hulbert | ................... B64C 27/20 104/23.2 |
| 3,184,183 A | * | 5/1965 | Plasecki | .................. B64C 27/20 244/23 R |

(Continued)

OTHER PUBLICATIONS

Author Unknown, "Suicide Bdyat: Development Trends Loitering Munitions. Part 2," topwar.ru, xn----ctbjbare5aadbdikvl8n.xn--p1ai/tehnika-i-vooruzhenie/184538-samoubijci-bdyat-napravleniya-razvitiya-barrazhiruyushih-boepripasov-chast-2_93368.html, 2012, military pensioners, pp. 1-11.

*Primary Examiner* — Medhat Badawi
(74) *Attorney, Agent, or Firm* — Withrow & Terranova, PLLC

(57) ABSTRACT

A control surface assembly for an unmanned aerial vehicle (UAV) is disclosed. The control surface assembly has a fin configured to be rotatably coupled to a fuselage of the UAV, with a control surface member rotatably coupled to the fin. A control surface linkage is configured to be coupled between the control surface member and an actuator disposed in the fuselage. The fin is rotatable with respect to the fuselage between a stowed configuration and a deployed configuration. In the deployed configuration, the control surface linkage is configured to rotate the control surface member with respect to the fin, when the actuator actuates the control surface linkage. In the stowed configuration, however, the control surface linkage is configured to move with respect to the fin without rotating the control surface member, when the actuator actuates the control surface linkage.

20 Claims, 12 Drawing Sheets

(56) References Cited

U.S. PATENT DOCUMENTS

| | | | | |
|---|---|---|---|---|
| 3,265,329 A * | 8/1966 | Postelson | B64C 27/20 | 180/122 |
| 3,599,904 A * | 8/1971 | Condit | B64C 3/38 | 244/1 R |
| 3,756,089 A * | 9/1973 | Haladay | B64C 13/24 | 16/367 |
| 3,826,448 A * | 7/1974 | Burk, Jr. | B64C 5/12 | 244/3.27 |
| 4,586,681 A * | 5/1986 | Wedertz | F42B 10/146 | 244/3.27 |
| 4,659,038 A * | 4/1987 | Hoeppner | B64C 3/56 | 244/3.27 |
| 4,664,338 A * | 5/1987 | Steuer | F42B 10/146 | 244/3.28 |
| 4,699,334 A * | 10/1987 | Boeder | F42B 10/16 | 244/3.23 |
| 4,998,689 A * | 3/1991 | Woodcock | B64C 3/38 | 244/201 |
| 5,071,383 A * | 12/1991 | Kinoshita | A63H 27/10 | 244/26 |
| 5,118,052 A * | 6/1992 | Alvarez Calderon | B64C 1/30 | 244/120 |
| 5,653,421 A * | 8/1997 | Ellzey | F15B 13/0402 | 251/129.1 |
| 5,671,899 A * | 9/1997 | Nicholas | B64C 3/40 | 244/3.28 |
| 5,816,532 A * | 10/1998 | Zasadny | F42B 10/20 | 244/3.29 |
| 5,839,698 A * | 11/1998 | Moppert | B64C 3/50 | 244/214 |
| 6,053,192 A * | 4/2000 | Ellzey | G05D 16/106 | 137/12 |
| 6,119,976 A * | 9/2000 | Rogers | B64C 39/024 | 244/13 |
| 6,152,692 A * | 11/2000 | Aubry | B64C 27/615 | 244/17.25 |
| 6,186,443 B1 * | 2/2001 | Shaffer | B64C 5/12 | 244/3.29 |
| 6,260,797 B1 * | 7/2001 | Palmer | B64C 39/024 | 102/501 |
| 6,854,686 B2 * | 2/2005 | Perlo | B64C 39/026 | 244/23 R |
| 6,923,404 B1 * | 8/2005 | Liu | B64C 3/40 | 244/46 |
| 6,978,970 B2 * | 12/2005 | Purcell, Jr. | B64C 3/56 | 244/49 |
| 7,584,925 B2 * | 9/2009 | Miller | B64C 39/024 | 244/3.28 |
| 7,841,559 B1 * | 11/2010 | O'Shea | B64C 39/024 | 244/219 |
| 7,866,610 B2 * | 1/2011 | Bousfield | B64C 3/18 | 244/218 |
| 8,089,034 B2 * | 1/2012 | Hammerquist | B64C 3/56 | 244/3.27 |
| 8,256,715 B2 * | 9/2012 | Ballard | B64C 39/024 | 244/123.1 |
| 8,376,279 B2 * | 2/2013 | Parks | B64C 3/56 | 244/123.11 |
| 8,443,727 B2 * | 5/2013 | Roemerman | F42B 10/64 | 102/222 |
| 8,492,692 B2 * | 7/2013 | Fisher | B64C 39/024 | 244/13 |
| 8,505,430 B2 * | 8/2013 | Miralles | B64C 39/024 | 89/1.815 |
| 8,608,103 B2 * | 12/2013 | Martin | B64D 33/10 | 244/4 A |
| 8,661,980 B1 * | 3/2014 | Roemerman | F42B 12/64 | 102/489 |
| 8,695,916 B2 * | 4/2014 | Martin | B64C 39/026 | 244/4 A |
| 8,708,285 B1 * | 4/2014 | Carreiro | B64C 39/028 | 244/190 |
| 8,888,035 B2 * | 11/2014 | Lind, Jr. | B60F 3/00 | 244/13 |
| 8,939,056 B1 * | 1/2015 | Neal, III | F42B 15/22 | 102/387 |
| 8,979,016 B2 * | 3/2015 | Hayden, III | B64C 29/00 | 244/12.2 |
| 8,985,504 B2 * | 3/2015 | Tao | B64C 3/44 | 244/3.28 |
| 9,004,396 B1 * | 4/2015 | Colin | B64D 47/08 | 244/17.23 |
| 9,056,679 B1 * | 6/2015 | Langston | B64D 1/12 | |
| 9,171,479 B2 * | 10/2015 | Martin | G09B 9/042 | |
| 9,545,991 B1 * | 1/2017 | Alley | B64C 3/40 | |
| 9,550,567 B1 * | 1/2017 | Erdozain, Jr. | B64C 29/02 | |
| 9,834,305 B2 * | 12/2017 | Taylor | B64C 29/0025 | |
| 2002/0104919 A1 * | 8/2002 | Geranio | B64C 27/20 | 244/2 |
| 2007/0018033 A1 * | 1/2007 | Fanucci | F42B 10/143 | 244/3.27 |
| 2008/0217470 A1 * | 9/2008 | Zhao | A63H 27/02 | 244/99.3 |
| 2009/0216394 A1 * | 8/2009 | Heppe | B64C 39/024 | 701/16 |
| 2011/0001016 A1 * | 1/2011 | Skillen | B64C 3/40 | 244/218 |
| 2012/0280080 A1 | 11/2012 | Lubenow et al. | | |
| 2013/0146716 A1 * | 6/2013 | Gettinger | B64C 3/56 | 244/215 |
| 2014/0131507 A1 * | 5/2014 | Kalantari | A63H 27/12 | 244/2 |
| 2016/0176503 A1 * | 6/2016 | Gettinger | B64C 3/56 | 244/3.27 |
| 2016/0176514 A1 * | 6/2016 | Lavagen | B64C 39/02 | 244/50 |
| 2016/0221671 A1 * | 8/2016 | Fisher | B64C 27/08 | |
| 2016/0288901 A1 * | 10/2016 | Fisher | B64C 11/02 | |
| 2016/0291445 A1 * | 10/2016 | Fisher, Sr. | G03B 15/006 | |
| 2016/0332747 A1 * | 11/2016 | Bradlow | B64D 47/08 | |
| 2017/0030715 A1 * | 2/2017 | Song | G01C 19/5783 | |
| 2017/0121034 A1 * | 5/2017 | Fisher | B64D 47/08 | |
| 2017/0183074 A1 * | 6/2017 | Hutson | B64C 1/061 | |
| 2017/0225782 A1 * | 8/2017 | Kohstall | B64C 39/024 | |

* cited by examiner

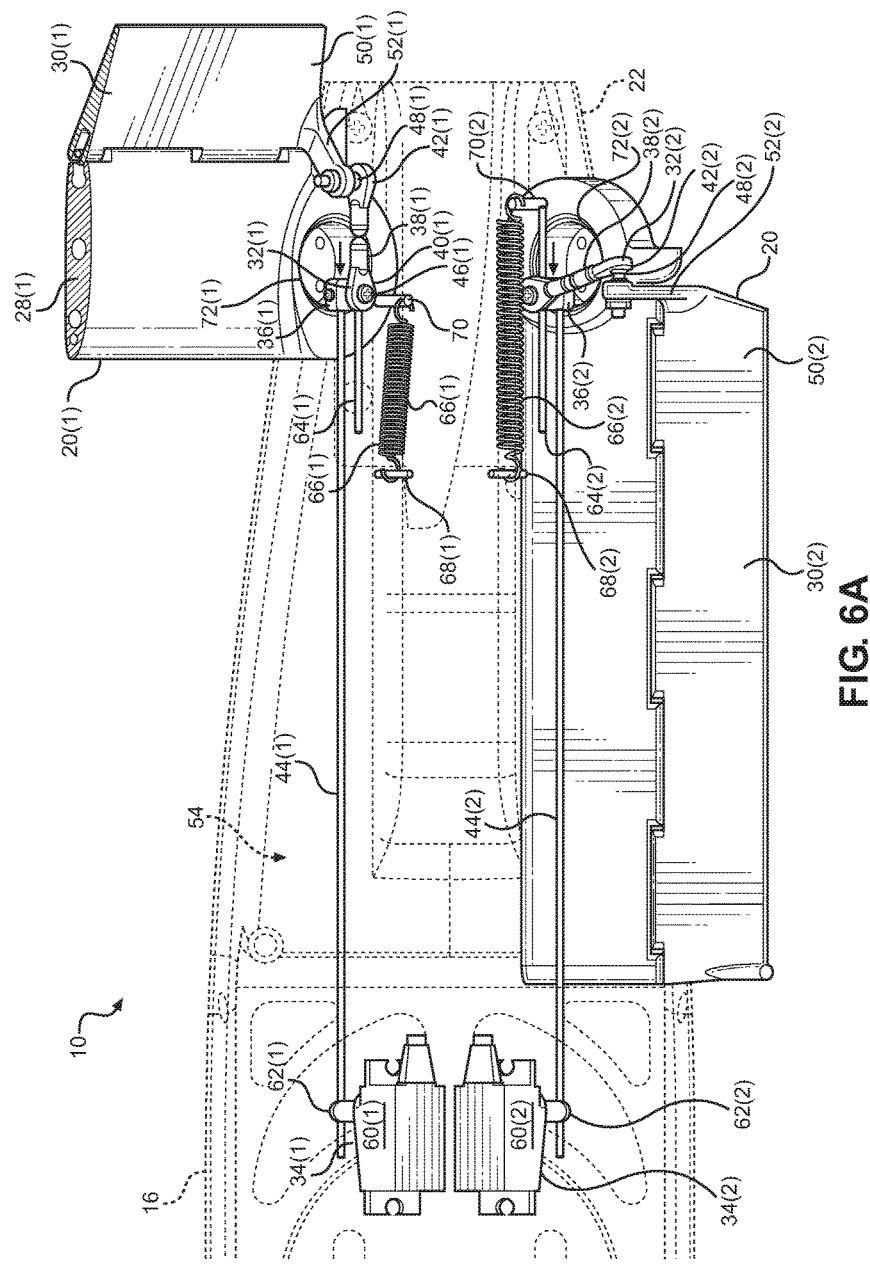

US 10,124,880 B1

ROTATABLE CONTROL SURFACE ASSEMBLY FOR AN UNMANNED AERIAL VEHICLE

TECHNICAL FIELD

The field of the disclosure relates to an aircraft, such as an unmanned aerial vehicle (UAV), and in particular to a control surface assembly that allows a control surface member to rotate with respect to a fuselage of the UAV.

BACKGROUND

Unmanned aerial vehicles (UAVs) are aircraft that are capable of flight without an onboard pilot. UAVs may be capable of autonomous flight, and may also be capable of being controlled by a remotely located human pilot. As a result, UAVs can be made smaller and more portable than manned aircraft. However, many UAVs require a plurality of fins with control surfaces, such as wings, rudders, and/or tailfins, to operate properly, which complicates storage and portability of the UAV. Accordingly, there is a need for a UAV with fins that can be quickly and reliably converted back and forth between a stowed configuration and a deployed configuration without interfering with the operation of the UAV.

SUMMARY

According to one embodiment, a control surface assembly for an unmanned aerial vehicle (UAV) is disclosed. The control surface assembly comprises a fin configured to be rotatably coupled to a fuselage, the fin rotatable between a stowed configuration and a deployed configuration. The control surface assembly further comprises a control surface member rotatably coupled to the fin. The control surface assembly further comprises a control surface linkage coupled to the control surface member, the control surface linkage configured to be actuated by an actuator disposed in the fuselage. In the deployed configuration, the control surface linkage is configured to rotate the control surface member with respect to the fin, responsive to actuation of the actuator. In the stowed configuration, the control surface linkage is configured to move with respect to the fin responsive to actuation of the actuator without rotating the control surface member.

According to another embodiment, a UAV is disclosed. The UAV comprises a fuselage having an interior. The UAV further comprises an actuator disposed in the interior of the fuselage. The UAV further comprises a fin rotatably coupled to the fuselage, the fin rotatable between a stowed configuration and a deployed configuration. The UAV further comprises a control surface member rotatably coupled to the fin. The UAV further comprises a control surface linkage coupled between actuator and the control surface member. In the deployed configuration, the actuator is configured to rotate the control surface member with respect to the fin.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 6A and 6B illustrate bottom cutaway views of the UAV of FIGS. 1A-5, with a left fin in the deployed configuration and a right fin in the stowed configuration.

DETAILED DESCRIPTION

Figure 1B:
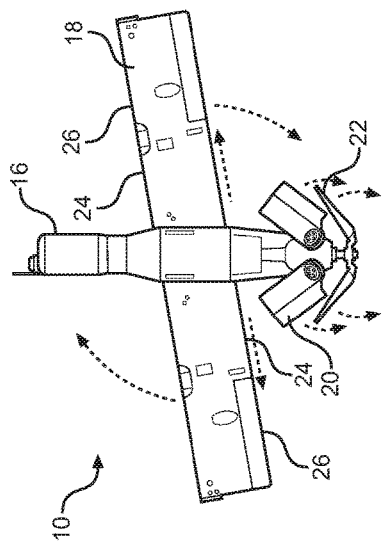
FIGS. 1A-1C illustrate an unmanned aerial vehicle (UAV) according to an embodiment being launched from a storage and launch tube, with the UAV converting from a stowed configuration to a deployed configuration during launch.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first end" and "second end," and does not imply a priority, a type, an importance, or other attribute, unless otherwise stated herein. The term "substantially" used herein in conjunction with a numeric value means any value that is within a range of five percent greater than or five percent less than the numeric value. The term "substantially" used herein in conjunction with an angular definition means any value that is within a range of five degrees greater than or five degrees less than the angular relationship.

Embodiments include a control surface assembly for an unmanned aerial vehicle (UAV). The control surface assembly comprises a fin configured to be rotatably coupled to a fuselage of the UAV, with a control surface member rotatably coupled to the fin. A control surface linkage is configured to be coupled between the control surface member and an actuator disposed in the fuselage. The fin is rotatable with respect to the fuselage between a stowed configuration, in which the UAV is prepared for storage, and a deployed configuration, in which the UAV is capable of flight. In the deployed configuration, the control surface linkage is configured to rotate the control surface member with respect to the fin when the actuator actuates the control surface linkage. In the stowed configuration, however, the control surface linkage is configured to move with respect to the fin without rotating the control surface member, when the actuator actuates the control surface linkage.

One advantage of disposing the actuator in the fuselage is that actuators may contain relatively heavy components, such as a motor, for example, that can interfere with the desired weight distribution of the UAV. For example, disposing the actuator on or in the rotatable fin itself can interfere with the aerodynamic characteristics, and can also make the UAV "tail-heavy" when disposed on or in a rearwardly disposed fin, such as a tailfin or rudder. For many UAV designs, it is more desirable to locate the heavier actuator components inside the fuselage in a forward location for optimal weight distribution.

This arrangement requires a mechanical linkage between the actuator and the control surface, but this presents difficulties when the fin is movable with respect to the fuselage. The mechanical linkage must be capable of moving the control surface when the fin is deployed, and the linkage must also be arranged so that actuating the linkage when the fin is deployed does not damage or stress the linkage or fin when the fin is stowed. One advantage of embodiments described herein is that a control surface linkage can operate the control surface in the deployed configuration and can also be actuated in the stowed configuration without damaging or stressing the control surface linkage or fin.

Figure 1C:
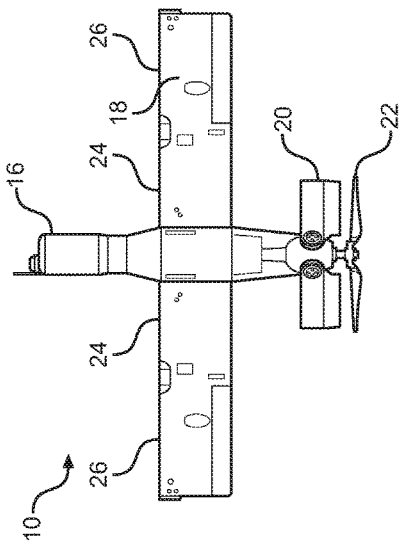
Figure 1A:
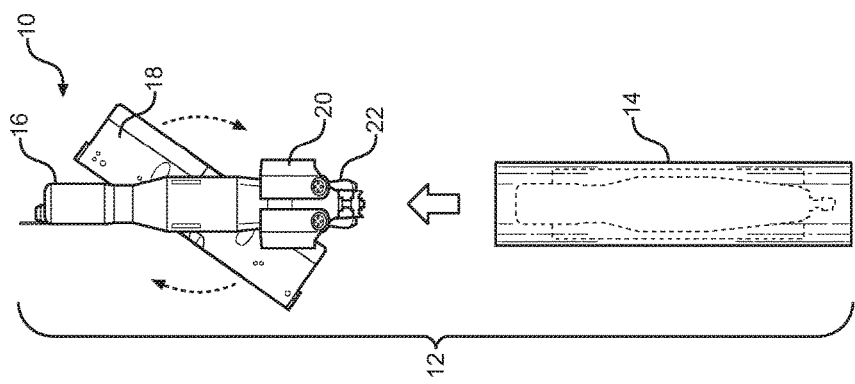

Before discussing the details of an example control surface linkage, a UAV 10 having a deployed and stowed configuration according to an embodiment is described in relation to FIGS. 1A-1C. The UAV 10 is part of a portable launch system 12 that also comprises a storage and launch tube 14. In this embodiment, the UAV 10 has a fuselage 16 sized to be stored in an interior of the storage and launch tube 14. The UAV 10 includes a wing sub-assembly 18, a pair of tail fin sub-assemblies 20, and a propeller 22, each of which is movable back and forth between the deployed and stowed configuration. In the stowed configuration of this embodiment, the wing sub-assembly 18 is folded and rotated, the tail fin sub-assemblies 20 are rotated, and the propeller 22 is folded so that the UAV 10 can be compactly stored in the storage and launch tube 14. In this embodiment, as shown in FIG. 1A, the storage and launch tube 14 may contain a launch mechanism that launches the UAV 10 out of the storage and launch tube 14. As the UAV 10 exits the storage and launch tube 14, FIGS. 1B and 1C illustrate the wing sub-assembly 18, the tail fin sub-assemblies 20 and the propeller 22 automatically rotating and/or folding into the deployed configuration. For example, a wing body 24 of the wing sub-assembly 18 automatically rotates with respect to the fuselage 16, the wing extension members 26 automatically unfold into place, and the propeller 22 also unfolds away from the fuselage into place. Each tail fin sub-assembly 20 is also configured to automatically rotate with respect to the fuselage 16 when the UAV 10 is launched from the storage and launch tube 14. In this manner, the UAV 10 can convert itself from the stowed configuration to the deployed configuration within seconds of being launched from the storage and launch tube 14.

Figure 2A:
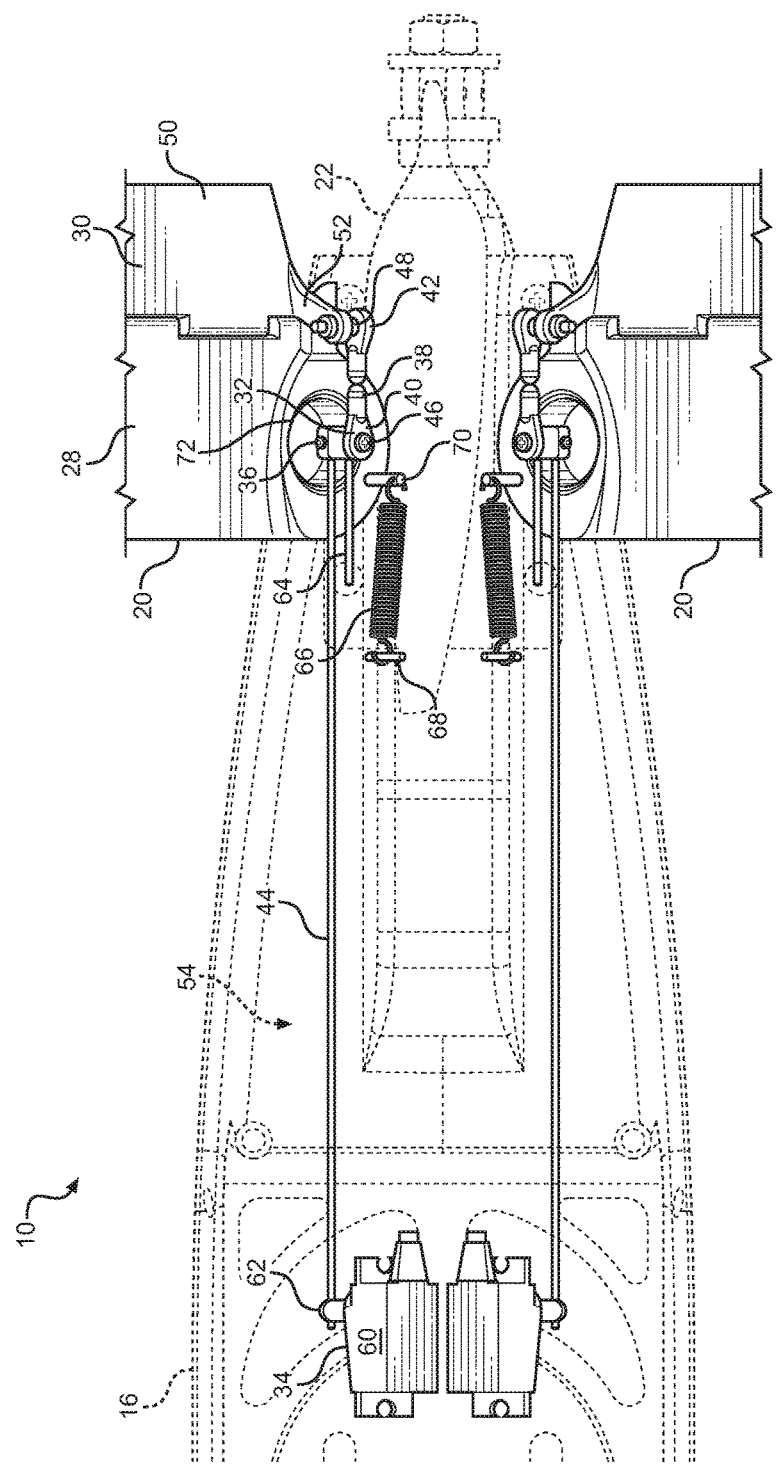
FIGS. 2A-2C illustrate internal components of the UAV of FIGS. 1A-1C in the deployed configuration, to illustrate operation of tail fin sub-assemblies of the UAV when deployed.
Figure 2B:
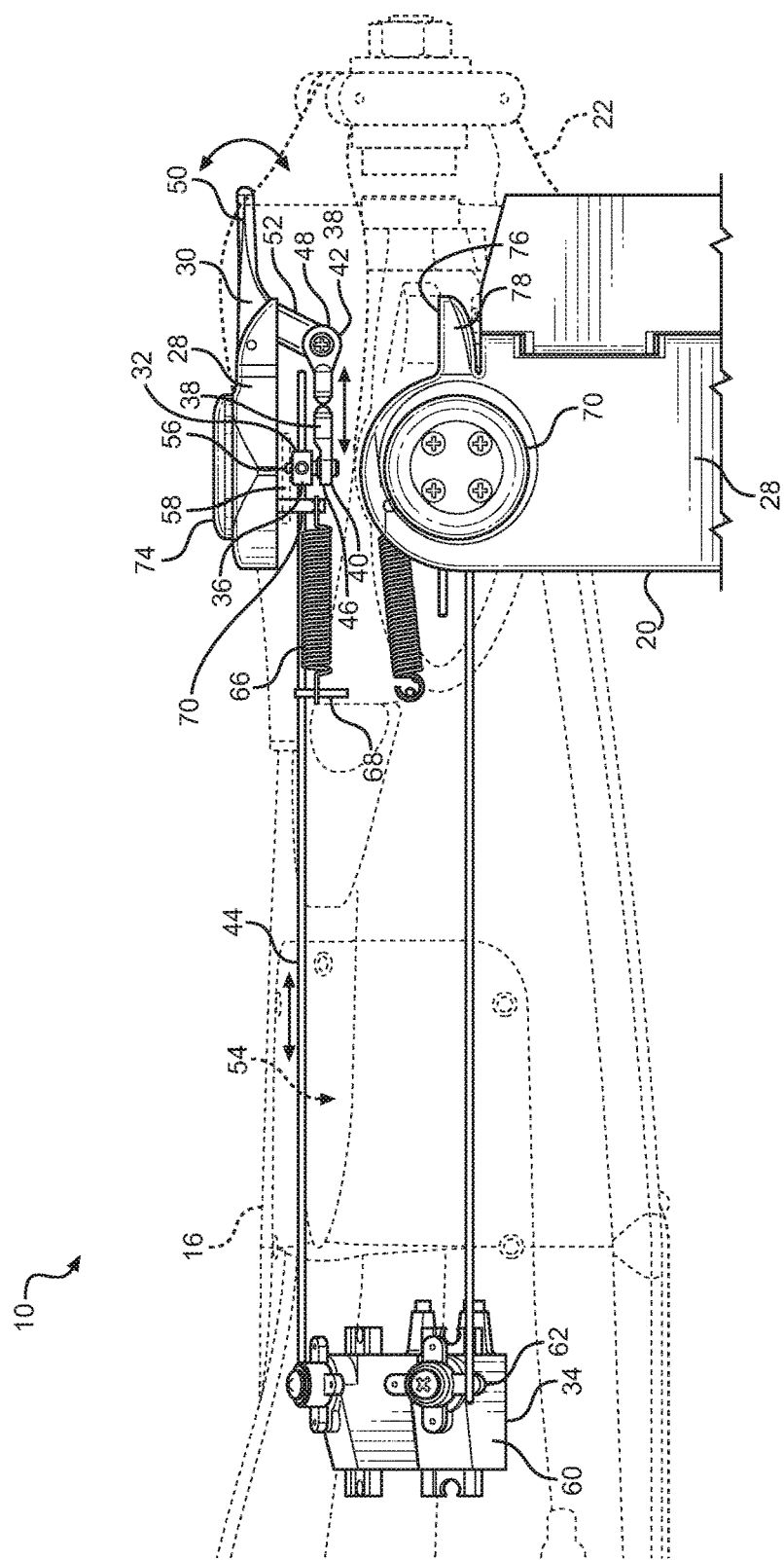
Figure 2C:
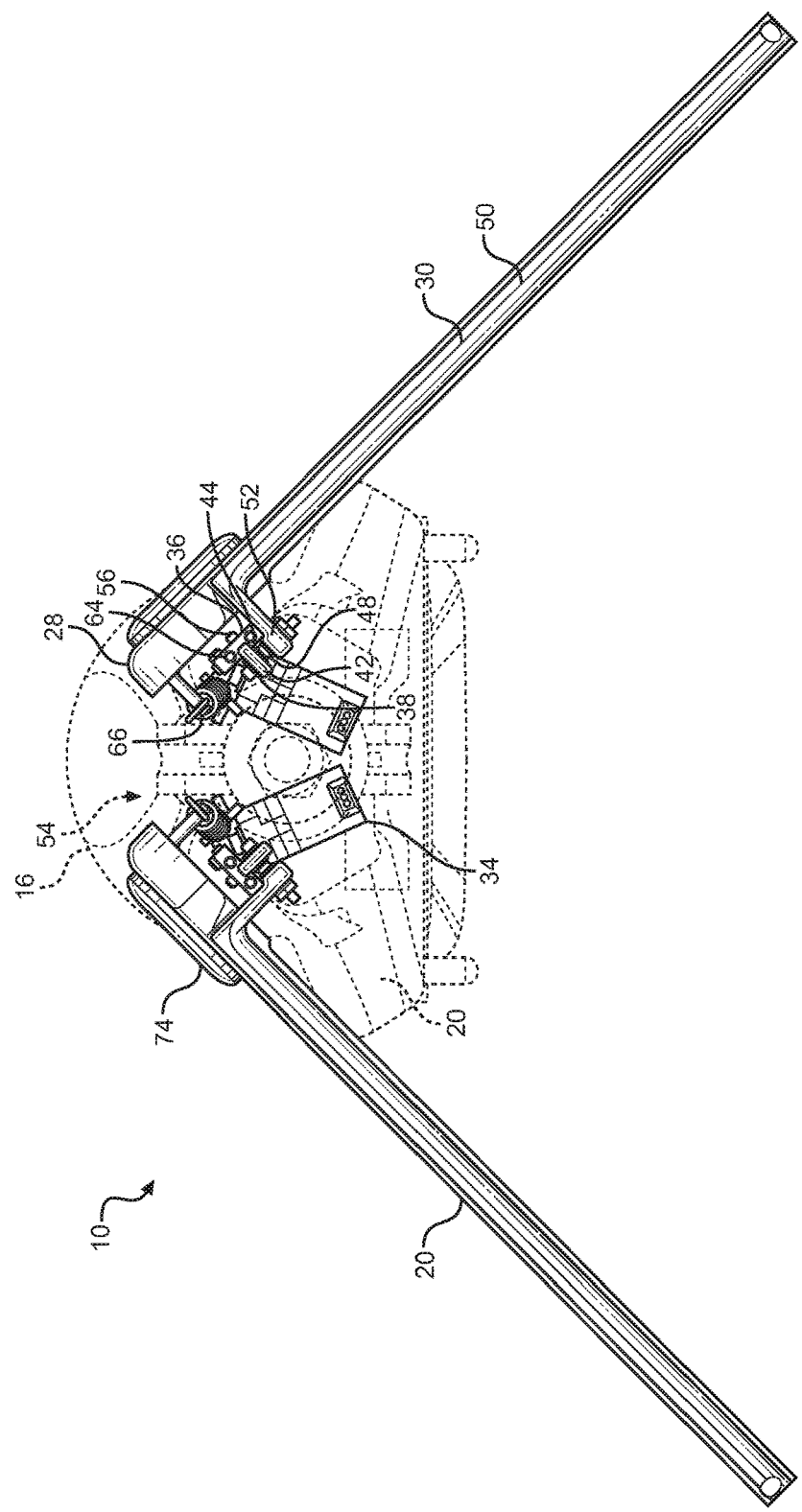

As discussed above, it is desirable to locate the heavier components within the fuselage 16, but this makes it difficult to mechanically control the movable elements located in the wing sub-assembly 18 and particularly in the tail fin sub-assemblies 20. In this regard, FIGS. 2A-2C illustrate internal components of the UAV 10 in the deployed configuration, to illustrate operation of the tail fin sub-assemblies 20 during flight. In particular, FIG. 2A is a bottom cutaway view, FIG. 2B is a top cutaway view at a 45-degree offset, and FIG. 2C is a rear cutaway view of the UAV 10. As shown by FIGS. 2A-2C, each tail fin sub-assembly 20 includes a fin 28 that is rotatably coupled to the fuselage 16, which allows the tail fin sub-assembly 20 to rotate back and forth between the deployed and stowed configuration. Each fin 28 has a control surface member 30 rotatably coupled thereto. In this embodiment, as shown by FIG. 2B, the tail fin sub-assembly 20 is arranged at a 45-degree downward angle with respect to the fuselage 16. This type of tail fin sub-assembly 20 is commonly called a ruddervator, because its control surface member 30 functions as a rudder and an elevator simultaneously. It should be understood, however, that aspects of the disclosed embodiments are equally applicable to other types of fins, such as, for example, a wing, a tailfin, rudder, etc.

In this embodiment, each tail fin sub-assembly 20 includes a control surface linkage 32 coupled between the control surface member 30 and an actuator 34 disposed in the fuselage 16. The control surface linkage 32 is configured to be actuated by the actuator 34 to rotate the control surface member 30 with respect to the fin 28. The control surface linkage 32 includes a translation member 36 configured to translate in a longitudinal direction with respect to the fuselage 16. A control link 38 is coupled between the translation member 36 at a first end 40 and the control surface 30 at a second end 42. In this embodiment, a pushrod 44 is connected between the translation member 36 and a respective actuator 34. The pushrod 44 extends substantially in the longitudinal direction and is fixed with respect to the translation member 36, such that actuating the actuator 34 moves the pushrod 44 and the translation member 36 in the longitudinal direction.

The first end 40 and the second end 42 of the control link 38 include a respective first ball link 46 coupled to the translation member 36 and second ball link 48 coupled to the control surface member 30. The first ball link 46 allows the control link 38 to rotate with respect to the translation member 36 with three degrees of freedom and the second ball link 48 permits the control link 38 to rotate with respect to the control surface member 30 with three degrees of freedom as well. In this embodiment, when the tail fin sub-assembly 20 and the control surface linkage 32 are in the deployed configuration, the control link 38 is substantially parallel to the longitudinal direction, and is aligned with the pushrod 44 and the translation member 36. As a result, actuating the actuator 34 causes the pushrod 44, the translation member 36, and the control link 38 to all move in the longitudinal direction in unison.

As discussed above, the second end 42 of the control link 38 is rotatably coupled to the control surface member 30 via the second ball link 48. The control surface member 30 includes a control surface 50 that is rotatable with respect to the fin 28, and an arm 52 that is fixed with respect to the control surface 50. The second ball link 48 of the control link 38 is rotatably coupled to the arm 52 such that moving the control link 38 in the longitudinal direction causes the arm 52 to rotate the control surface 50 with respect to the fin 28 about an axis substantially parallel to the fin 28 when the fin 28 is in the deployed configuration. As a result, when the fin 28 is in the deployed configuration, the actuator 34 is able to move the pushrod 44, the translation member 36, and the control link 38 in unison in the longitudinal direction to cause the arm 52 to rotate the control surface 50 with respect to the fin 28. In this embodiment, moving the pushrod 44, the translation member 36, and the control link 38 forward with respect to the fuselage 16 causes the control surface 30 to rotate down with respect to the fin 28, and moving the pushrod 44, the translation member 36, and the control link 38 rearward with respect to the fuselage 16 causes the control surface 30 to rotate up with respect to the fin 28. It should be understood, however, that other functional arrangements are contemplated.

In this manner, the actuator 34 can be disposed in an interior 54 of the fuselage 16 while retaining the ability to control the control surface member 30 of the rotatable fin 28. The actuator 34 includes a motor 60, such as a servo or a stepper motor for example, and a rotatable actuator arm 62 connected to the pushrod 44. As the actuator arm 62 rotates, the pushrod 44 moves forward or rearward substantially in the longitudinal direction, thereby moving the translation member 36 in the longitudinal direction as well. In this embodiment, the translation member 36 includes a protrusion 56 that slidably engages a slot 58 (See FIG. 2B) disposed in the interior of the fuselage 54. The translation member 36 is also slidably mounted about a guide rod 64 that extends parallel to the slot 58 and is fixed with respect to the fuselage 16. The slot 58 and the guide rod 64 both extend in the longitudinal direction and cause the translation member 36 to translate substantially in the longitudinal direction along the slot 58 when the actuator 34 actuates the pushrod 44 forward or rearward.

During operation of the UAV 10, each tail fin sub-assembly 20 is biased toward the deployed configuration by a respective tension spring 66. Each spring 66 is connected between a fuselage 16 spring pin 68 fixed to the interior 54 of the fuselage 16 and a fin spring pin 70 fixed to the fin 28. In this embodiment, the fin 28 has a circular recess 72 formed therein which matingly engages a gasket 74 coupled to the fuselage 16. The gasket 74 retains the fin 28 with respect to the fuselage 16 while permitting the fin 28 to rotate with respect to the fuselage 16 between the stowed and deployed configurations. In this embodiment, the fuselage 16 has a pair of fuselage stops 76 configured to engage and retain a complementary fin stop 78 on each fin 28 when the fin 28 is in the deployed configuration. In this manner, the spring 66 retains the fin 28 in the deployed configuration by biasing the fin 28 to engage the fin stop 78 with the respective fuselage stop 76.

Figure 3A:
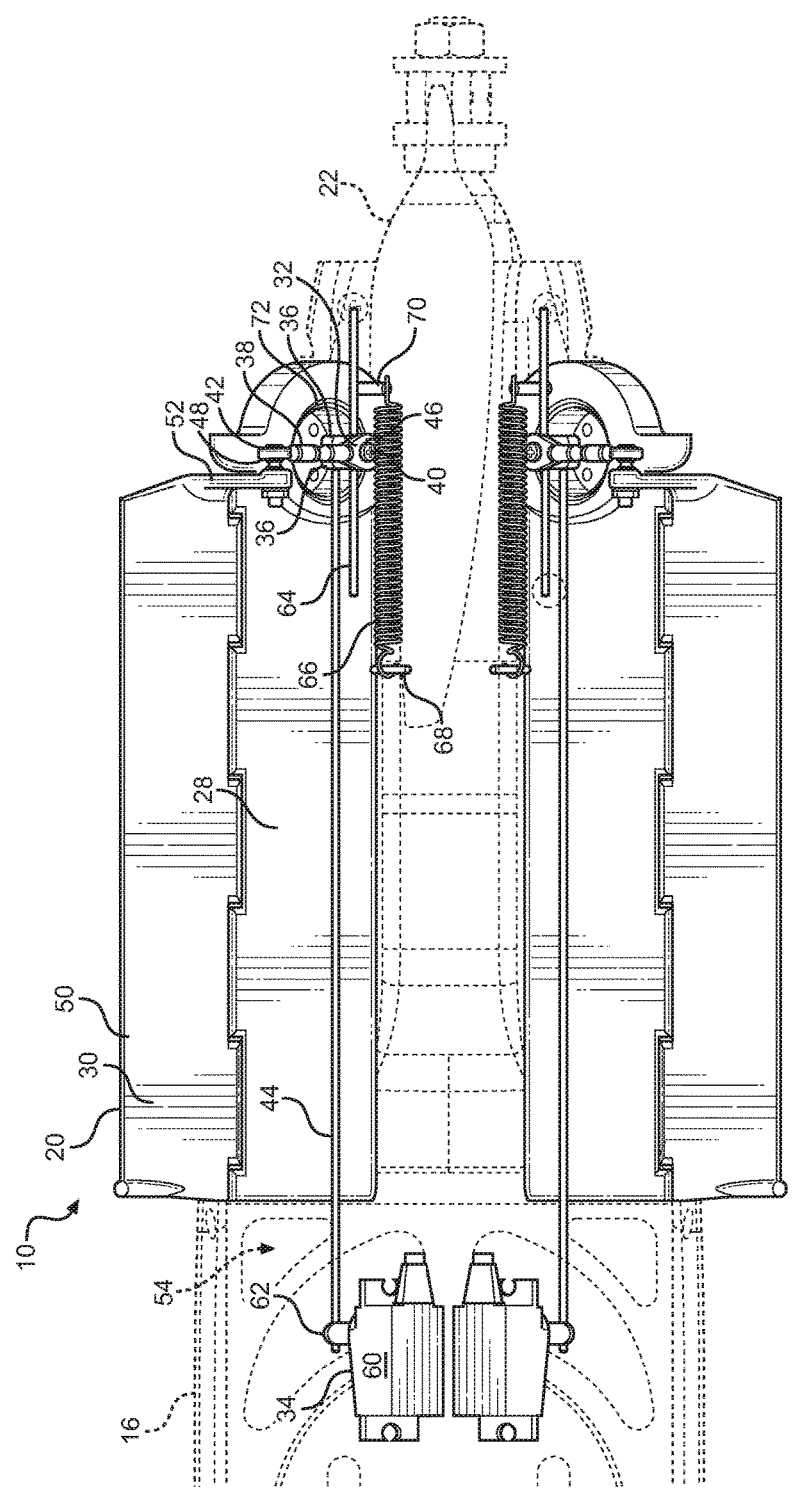
FIGS. 3A-3C illustrate internal components of the UAV of FIGS. 1A-2C in the stowed configuration, to illustrate operation of tail fin sub-assemblies of the UAV when stowed.
Figure 3B:
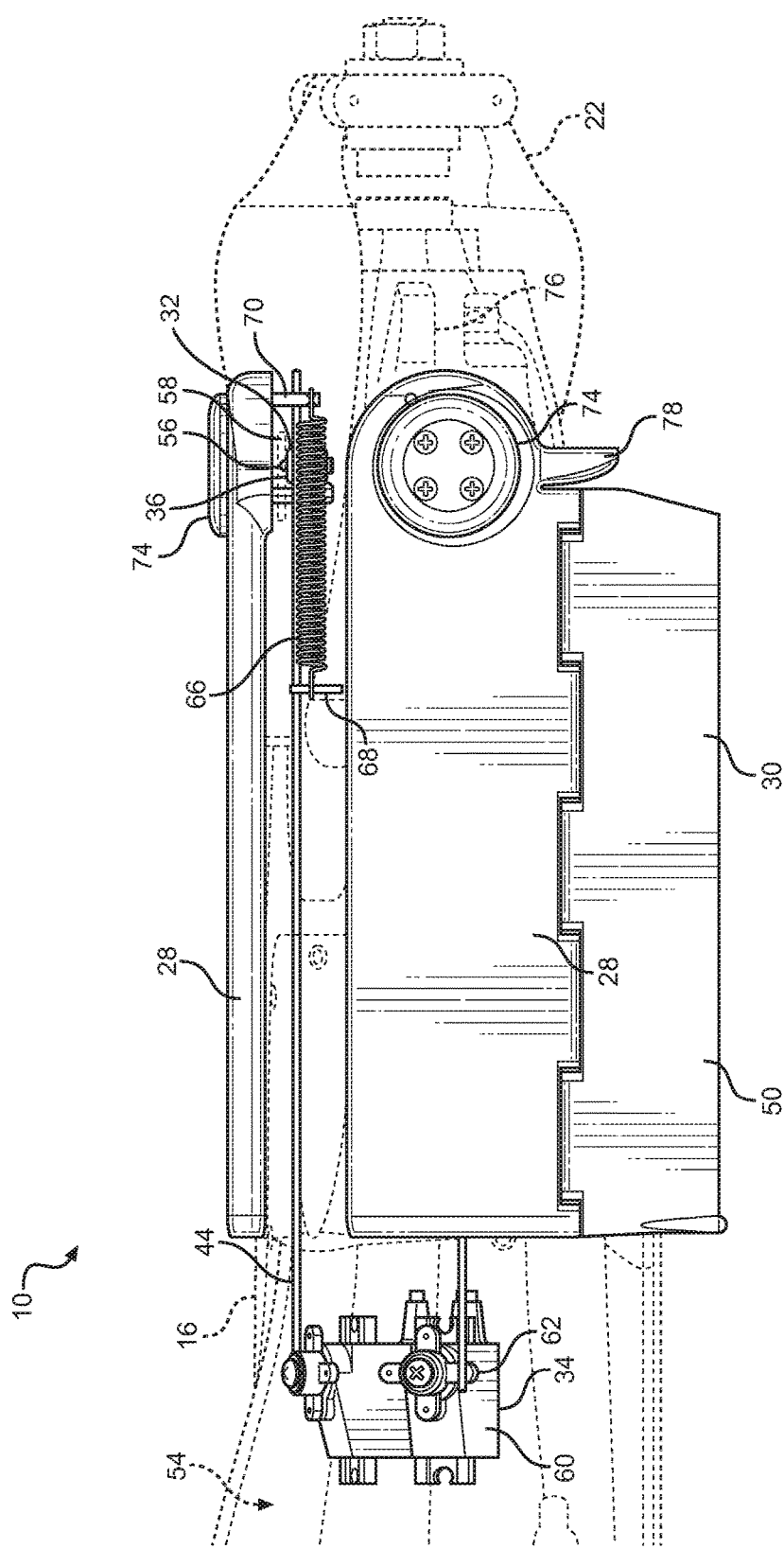
Figure 3C:
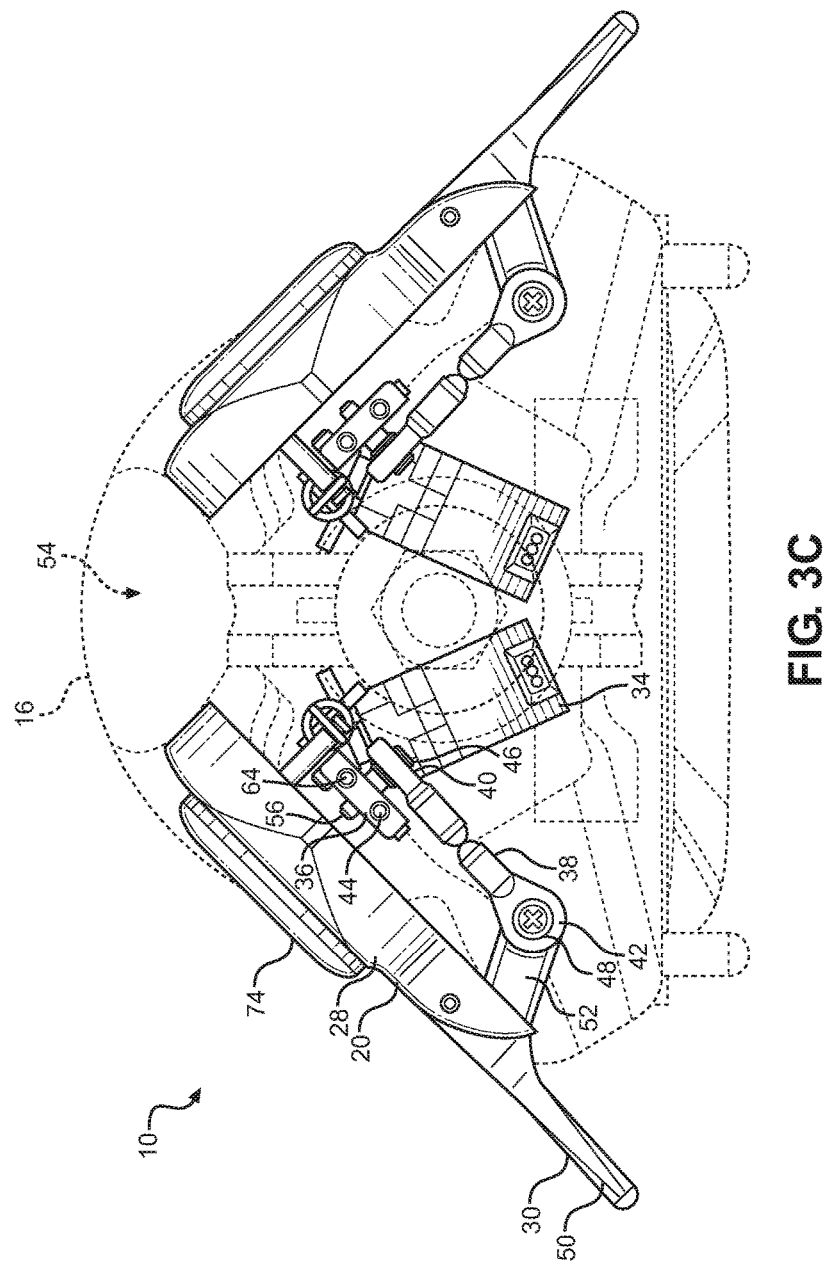

Having described the operation of the control surface linkage 32 when the tail fin sub-assembly 20 is in the deployed configuration, the arrangement and operation of the control surface linkage 32 when the tail fin sub-assembly 20 is in the stowed configuration will now be described with respect to FIGS. 3A-3C. In particular, FIGS. 3A-3C illustrate the same components of UAV 10 described above with respect to FIGS. 2A-2C, but in the stowed configuration. As shown by FIGS. 3A-3C, each fin 28 is rotated with respect to the fuselage 16 so as to be relatively flush and parallel with the fuselage 16. This permits the UAV 10 to be inserted into a storage receptacle, such as, for example, the storage and launch tube 14 described above with respect to FIG. 1A. Referring now to FIG. 3A, it can be seen that rotating the fin 28 causes the fin spring pin 70 to move away from the fuselage 16 spring pin 68, thereby extending and increasing tension in the spring 66. When the fin 28 is released, for example by being launched out of the storage and launch tube 14, the added tension in the spring 66 causes the fin 28 to quickly rotate back into the deployed configuration.

The control link 38 rotates with the fin 28 when the fin 28 is rotated to the stowed configuration. The control link 38 rotates about the first ball link 46 coupled to the translation member 36 at the first end 40 of the control link 38. When the translation member 36 is in a neutral position, the control link 38 is at a normal to the longitudinal direction. However, unlike in the deployed configuration, moving the translation member 36 in the stowed configuration, for example in response to actuating the actuator 34, will cause the control surface linkage 32 to move with respect to the fin 28 without rotating the control surface member 30. In this embodiment, actuating the actuator 34 instead causes the translation member 36 to rotate the control link 38 about the second ball link 48 coupled to the arm 52 of the control surface member 30 at the second end 42 of the control link 38. In this embodiment, the control link 38 rotates through an arc that includes the normal to the longitudinal direction. The movement characteristics of the control link 38 will be described below in greater detail with respect to FIGS. 6A and 6B.

Figure 4:
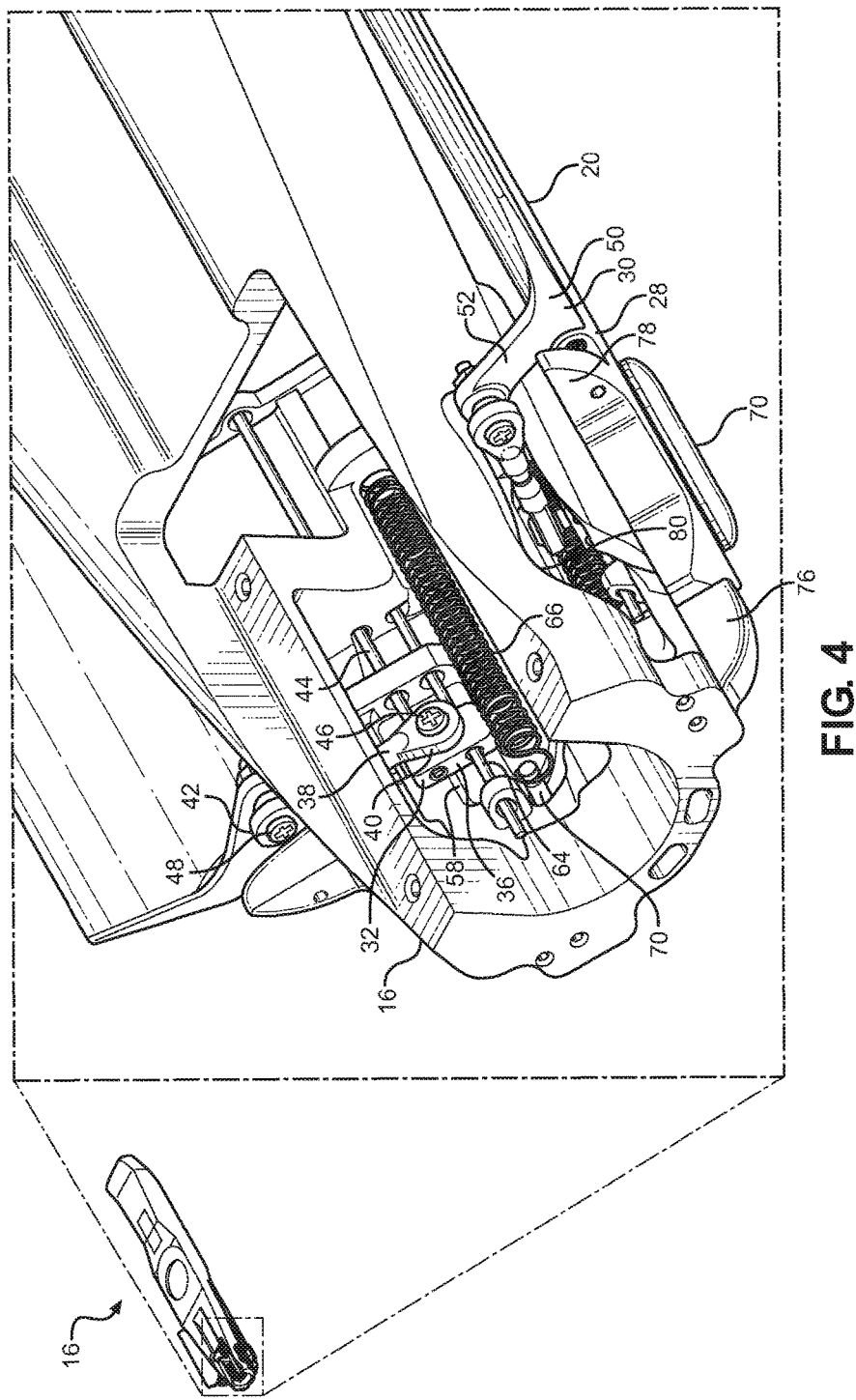
FIG. 4 illustrates a detail view of a portion of an inverted perspective view of the UAV according to the embodiment of FIGS. 1A-3C in the stowed configuration.

Referring now to FIG. 4, a detail view of a portion of an inverted perspective view of the UAV 10 according to the embodiment of FIGS. 2A-3C in the stowed configuration is illustrated. This view includes a cutaway of the fuselage 16 to show elements of the control surface linkage 32, including the translation member 36, the pushrod 44, and the control link 38. The fuselage 16 includes a slot 80 that allows the control link 38 to extend from the translation member 36 in the interior 54 of the fuselage 16 at the first end 40 to the arm 52 of the control surface member 30 at the second end 42. The slot 80 also permits the control link 38 to rotate with the control surface member 30 as the fin 28 is rotated with respect to the fuselage 16 between the stowed configuration and the deployed configuration.

Figure 5:
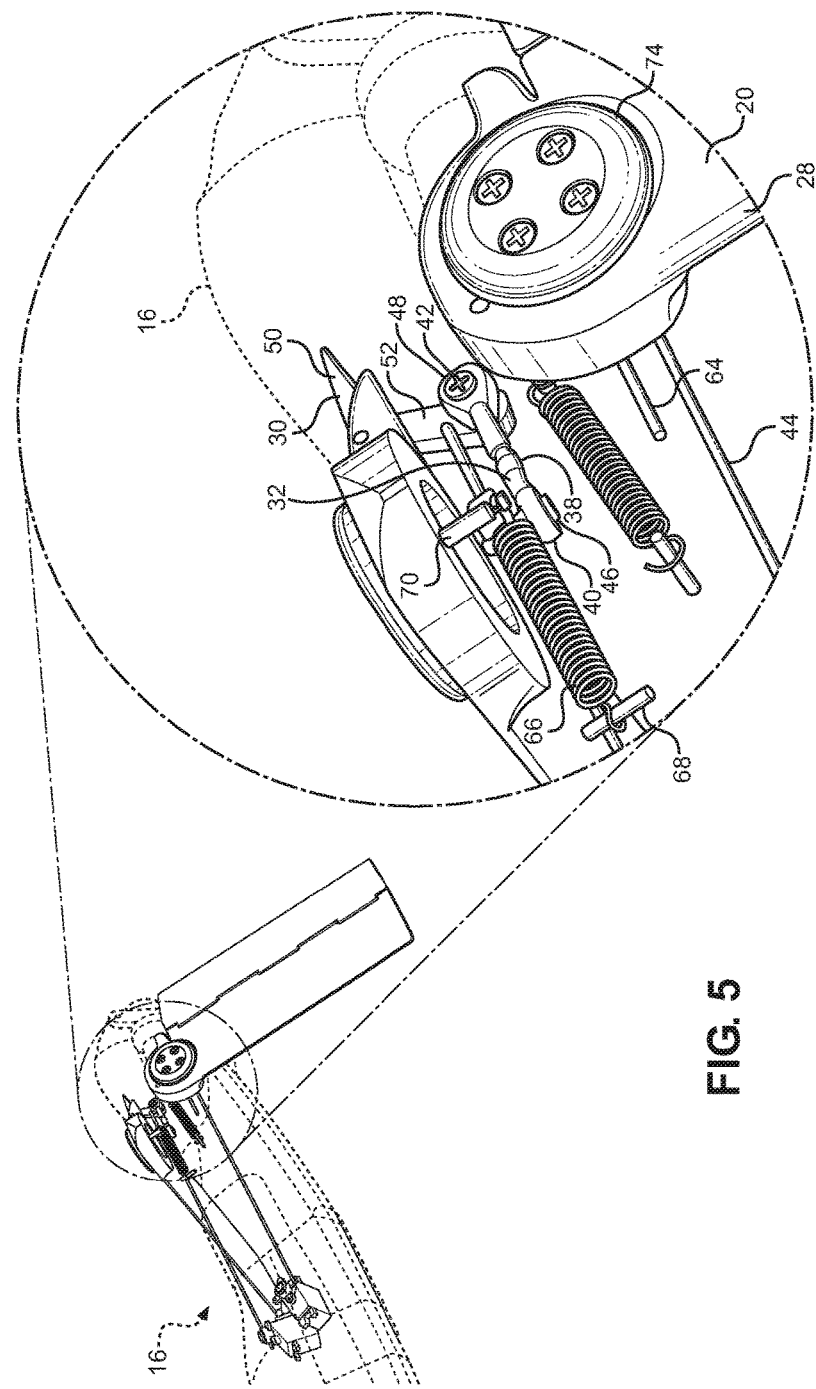
FIG. 5 illustrates a detail view of a portion of a perspective view of the UAV according to the embodiment of FIGS. 1A-4 in the deployed configuration.

In this regard, FIG. 5 is a detail view of a portion of a perspective view of the UAV 10 in the deployed configuration. As was described in detail above with respect to FIGS. 2A-2B, the control link 38 is substantially parallel with the longitudinal direction when the control surface member 30 is in the deployed configuration, thereby permitting the pushrod 44, the translation member 36, and the control link 38 to be actuated in unison to rotate the control surface member 30 with respect to the fin 28.

Figure 6B:
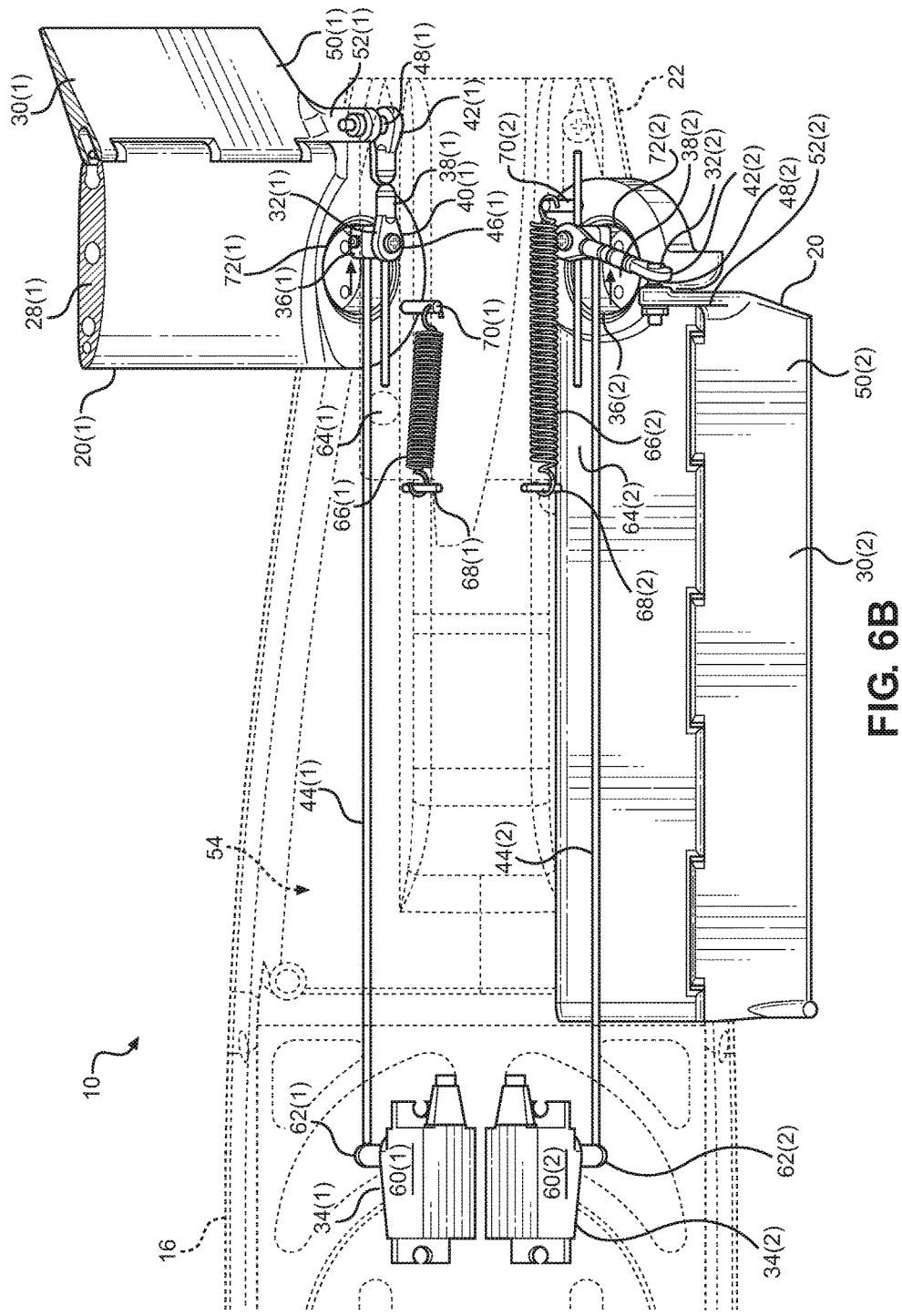

To further illustrate the movement and operation of the control link 38 in the stowed and deployed configurations, FIGS. 6A and 6B illustrate bottom cutaway views of the UAV 10, with the left fin 28(1) in the deployed configuration and the right fin 28(2) in the stowed configuration. For convenience, elements corresponding to the left side of the UAV 10 include a (1) designation below, and elements corresponding to the right side of the UAV 10 include a (2) designation below. In all other respects, the elements of FIGS. 6A and 6B correspond to elements discussed above with respect to FIGS. 1A-5.

In FIG. 6A, the left actuator 34(1) pulls the left pushrod 44(1) forward, thereby moving the left translation member 36(1) forward in the longitudinal direction. The left control link 38(1) is substantially parallel with the longitudinal direction because the left fin 28(1) is in the deployed configuration. As a result, the forward movement of the left control link 38(1) pulls the left arm 52(1) forward and causes the left control surface 50(1) of the left control surface member 30(1) to rotate downwardly with respect to the left fin 28(1).

In contrast, the right fin 28(2) of FIG. 6A is in the stowed configuration. Here, when the right actuator 34(2) causes the right translation member 36(2) to move forward, the right control link 38(2) rotates forward about the second ball link 48(2) coupled to the right arm 52(2) of the right control surface member 30(2) at the second end 42(2). In this embodiment, the first ball link 46(2) and second ball link 48(2) allow the control link 38 to rotate and twist with respect to the translation member 36(2) and arm 52(2) as needed when the fin 28(2) is in the stowed configuration, regardless of whether the translation member 36(2) is moved forward with respect to the fuselage 16.

Similarly, FIG. 6B illustrates movement and operation of the control link 38 in the stowed and deployed configurations when the translation members 36 are moved rearward by the actuators 34. Here again, because the left control link 38(1) is substantially parallel with the longitudinal direction when the left fin 28(1) is in the deployed configuration, movement of the left translation member 36(1) rearward causes the left control link 38(1) to push the left arm 52(1) rearward and causes the left control surface 50 of the left control surface member 30(1) to rotate upwardly with respect to left the fin 28(1). In contrast, when the right actuator 34(2) causes the right translation member 36(2) to move rearward, the right control link 38(2) rotates rearward about the right second ball link 48(2) coupled to the right arm 52(2) of the right control surface member 30(2) at the right second end 42(2), without moving the right control surface member 30(2) or causing any stress or damage to the right first ball joint 46(2), the second ball joint 48(2), or any other part of the right control surface linkage 32(2).

In the above embodiments, the translation member 36 is entirely disposed in the interior 54 of the fuselage 16, and the control link 38 is partially disposed in the interior 54 of the fuselage 16. One advantage of this arrangement is that, by disposing as many components as possible in the interior 54 of the fuselage 16, the UAV 10 can have fewer protuberances into the airstream around the UAV 10 during flight, thereby improving the aerodynamic profile and flight characteristics of the UAV 10. In other embodiments, however, space constraints may nevertheless require that additional components be disposed outside the aircraft.

Figure 7:
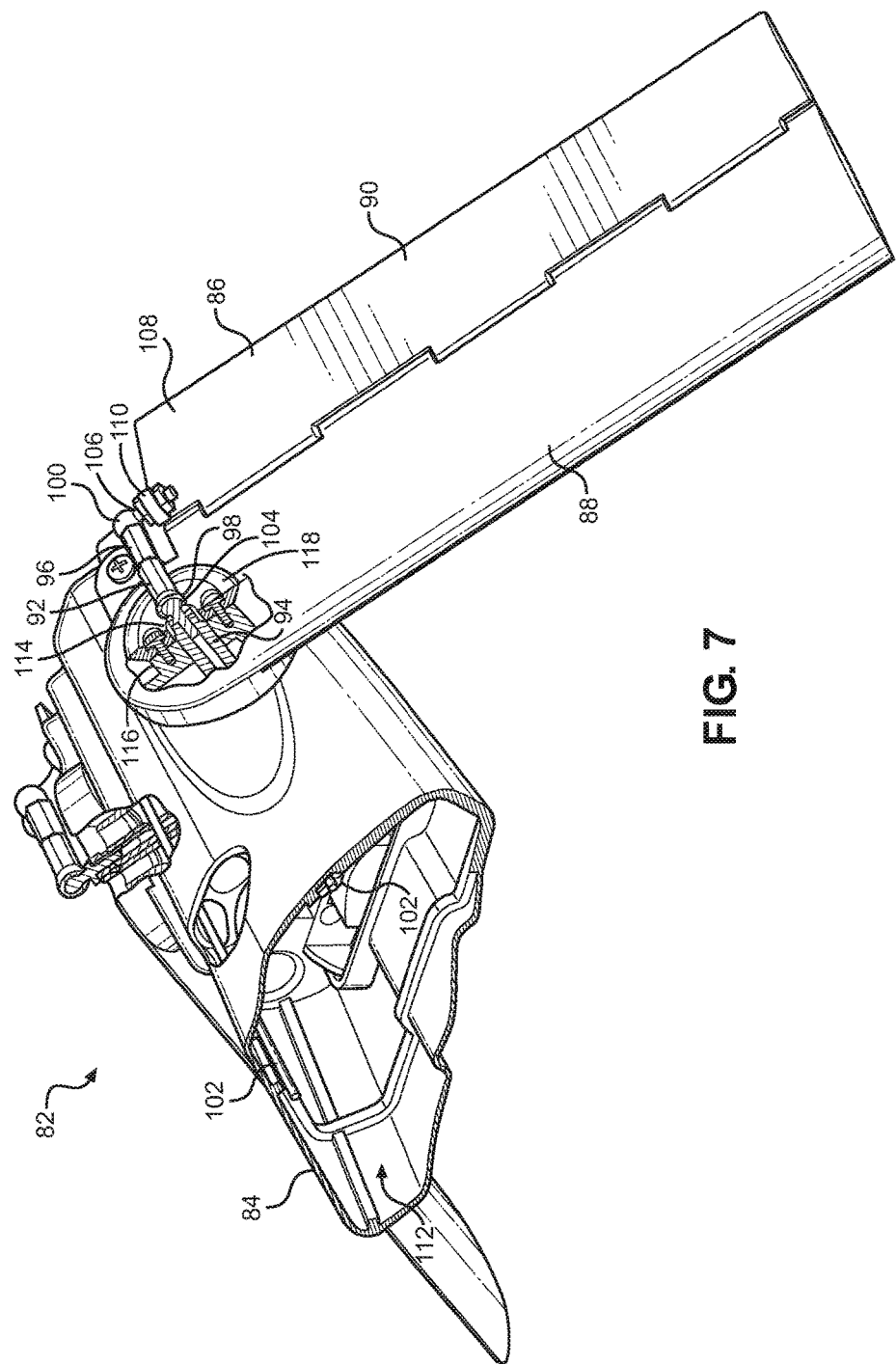
FIG. 7 illustrates a partial cutaway view of a UAV according to an alternate embodiment, with portions of a control surface linkage disposed outside the fuselage of the UAV.

In this regard, FIG. 7 illustrates partial cutaway view of a UAV 82 according to an alternate embodiment. In this embodiment, the UAV 82 includes a fuselage 84 having an alternative tail fin sub-assembly 86. The tail fin sub-assembly 86 includes a fin 88 rotatable about the fuselage 84 and a control surface member 90 rotatable about the fin 88. The UAV 82 also includes an alternate control surface linkage 92 having a translation member 94 extending through the fuselage 84 and a control link 96 rotatably coupled between the translation member 94 at a first end 98 and the control surface member 90 at the second end 100, with the entire control link 96 disposed outside the fuselage 84.

A pushrod 102 coupled to an actuator (not shown) moves the translation member 94, which causes the control link 96 to move the control surface member 90 via first ball link 104 and second ball link 106. The control surface member 90 includes a control surface 108 and arm 110 fixed with respect to the control surface 108 and rotatably coupled to the second ball link 106. In this embodiment, the pushrod 102 moves the translation member 94 along the longitudinal direction within a slot 114 that is fixed with respect to the fuselage 84, thereby causing the control link 96 to control the control surface member 90 when the fin 88 is in the deployed configuration and to move with respect to the control surface member 90 without moving the control surface member 90 when the fin 88 is in the stowed configuration (not shown). In this embodiment, each fin 88 has a circular recess 116 formed therein which matingly engages a gasket 118 coupled to the fuselage 84. The gasket 118 retains the fin 88 with respect to the fuselage 84 while permitting the fin 88 to rotate with respect to the fuselage 84 between the stowed and deployed configurations. In this embodiment, the slot 114 is formed in the gasket 118, thereby permitting the translation member 94 to move in the longitudinal direction along the slot 114, thereby permitting full movement of the control surface member 90 when the fin 88 is in the deployed configuration while minimizing movement of the control surface member 90 when the fin 88 is in the stowed configuration.

Those skilled in the art will recognize improvements and modifications to the preferred embodiments of the disclosure. All such improvements and modifications are considered within the scope of the concepts disclosed herein and the claims that follow.

What is claimed is:

1. A control surface assembly for an unmanned aerial vehicle (UAV) comprising:
a fin configured for rotatable coupling to a fuselage, the fin rotatable between a stowed configuration and a deployed configuration;
a control surface member rotatably coupled to the fin; and
a control surface linkage coupled to the control surface member, the control surface linkage configured for actuation by an actuator disposed in the fuselage, wherein:
in the deployed configuration, the control surface linkage is configured to rotate the control surface member with respect to the fin responsive to actuation of the actuator, and
in the stowed configuration, the control surface linkage is configured to move with respect to the fin responsive to actuation of the actuator without rotating the control surface member.

2. The control surface assembly of claim 1, wherein the control surface linkage comprises:
a translation member configured to translate with respect to the fuselage in response to the actuator actuating the control surface linkage;
a control link coupled between the translation member and the control surface member.

3. The control surface assembly of claim 2, wherein the control link comprises:
a first end rotatably coupled to the translation member with three degrees of freedom; and
a second end rotatably coupled to the control surface member with three degrees of freedom.

4. The control surface assembly of claim 3, further comprising a pushrod extending in a first direction, the pushrod coupled to the translation member,
wherein the pushrod is configured for coupling to the actuator such that actuating the actuator moves the pushrod substantially in the first direction.

5. The control surface assembly of claim 4, wherein the pushrod is fixed with respect to the translation member.

6. The control surface assembly of claim 4, wherein the control link is substantially parallel to the first direction when the fin is in the deployed configuration.

7. The control surface assembly of claim 4, wherein the control link is rotatable about the second end through an arc comprising a normal to the first direction when the fin is in the stowed configuration.

8. The control surface assembly of claim 3, wherein the first end of the control link comprises a first ball link coupled to the translation member; and
the second end of the control link comprises a second ball link coupled to the control surface member.

9. The control surface assembly of claim 2, wherein the control surface member comprises:
a control surface rotatable with respect to the fin about an axis substantially parallel to the fin; and an arm fixed with respect to the control surface, the arm coupled to the control link.

10. The control surface assembly of claim 9, wherein the control link comprises:
   a first end rotatably coupled to the translation member with three degrees of freedom; and
   a second end rotatably coupled to the arm of the control surface member with three degrees of freedom.

11. The control surface assembly of claim 10, further comprising:
   the fuselage extending in a longitudinal direction substantially parallel to a first direction, the fuselage comprising an interior, wherein the fin is rotatably coupled to the fuselage;
   the actuator disposed in the interior of the fuselage.

12. An unmanned aerial vehicle (UAV) comprising:
   a fuselage having an interior;
   an actuator disposed in the interior of the fuselage;
   a fin rotatably coupled to the fuselage, the fin rotatable between a stowed configuration and a deployed configuration;
   a control surface member rotatably coupled to the fin; and
   a control surface linkage coupled between the actuator and the control surface member,
   wherein, in the deployed configuration, the actuator is configured to rotate the control surface member with respect to the fin, and in the stowed configuration, the actuator is configured to move the control surface linkage with respect to the control surface member without rotating the control surface member.

13. The UAV of claim 12, wherein the control surface linkage comprises:
   a translation member configured to translate with respect to the fuselage in response to the actuator actuating the control surface linkage;
   a control link coupled between the translation member and the control surface member.

14. The UAV of claim 13, wherein the control link comprises:
   a first end rotatably coupled to the translation member with three degrees of freedom; and
   a second end rotatably coupled to the control surface member with three degrees of freedom.

15. The UAV of claim 14, further comprising a pushrod extending in a longitudinal direction with respect to the fuselage, the pushrod coupled between the translation member and the actuator such that actuating the actuator moves the pushrod substantially in the longitudinal direction.

16. The UAV of claim 15, wherein the control link is substantially parallel to the longitudinal direction when the fin is in the deployed configuration.

17. The UAV of claim 15, wherein the control link is rotatable about the second end through an arc comprising a normal to the longitudinal direction when the fin is in the stowed configuration.

18. The UAV of claim 15, wherein the translation member further comprises a protrusion configured to slidably engage a slot disposed in the fuselage, the slot extending substantially parallel to the longitudinal direction.

19. The UAV of claim 13, wherein the control surface member comprises:
   a control surface rotatable with respect to the fin about an axis substantially parallel to the fin; and
   an arm fixed with respect to the control surface, the arm coupled to the control link.

20. The UAV of claim 12, further comprising:
   a spring coupled between the fuselage and the fin, the spring configured to bias the fin toward the deployed configuration.

* * * * *